Figures 1, 1A:
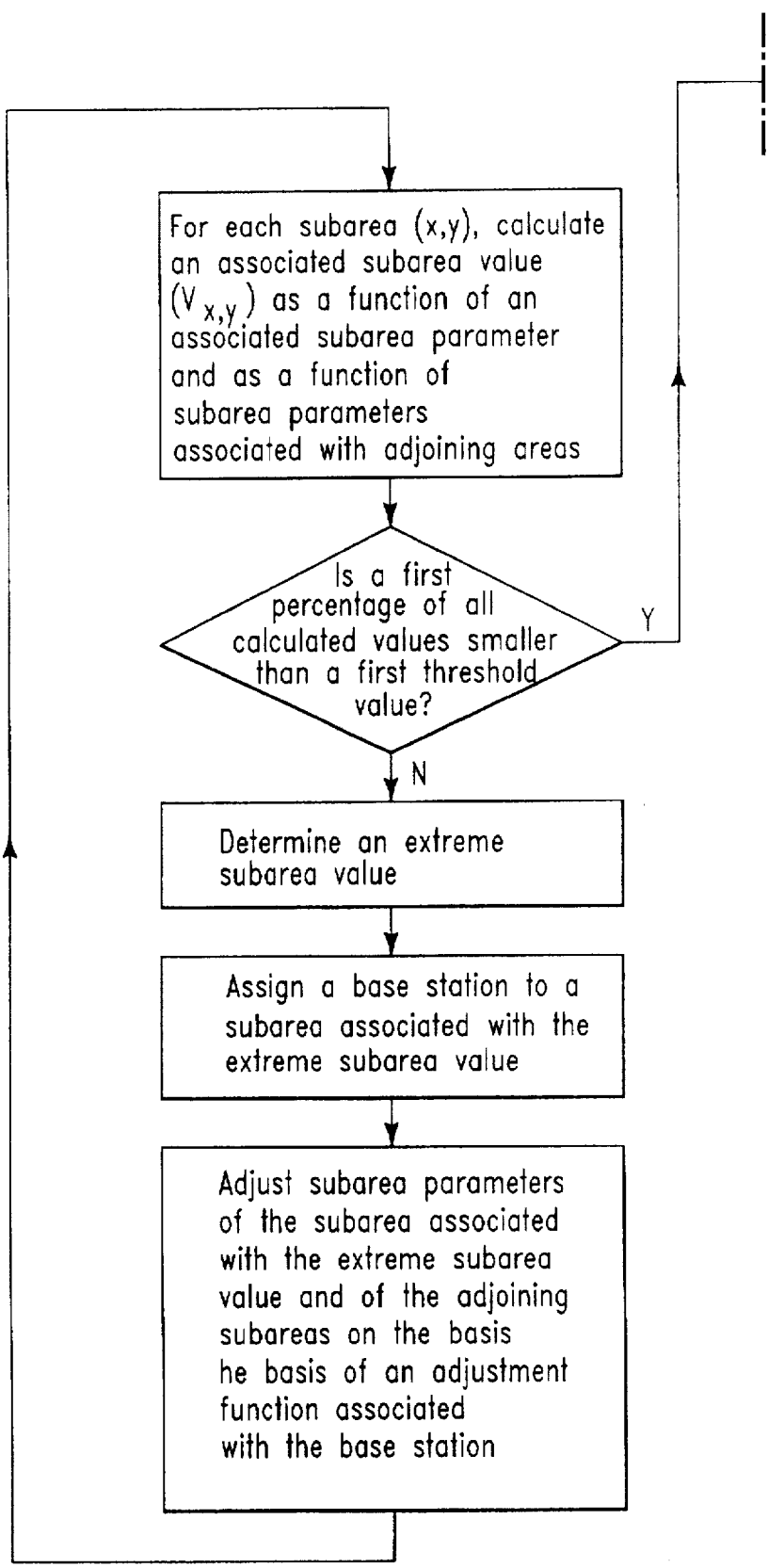

United States Patent [19]

van der Vorm et al.

[11] Patent Number: 5,787,350

[45] Date of Patent: Jul. 28, 1998

[54] METHOD FOR DETERMINING BASE STATION LOCATIONS, AND DEVICE FOR APPLYING THE METHOD

[75] Inventors: Teun van der Vorm, Zoetermeer; Jacob Noordhuis, Voorburg; Robertus Johannes Leonardus Buckers, Schiedam, all of Netherlands

[73] Assignee: Koninklijke PTT Nederland N.V., Netherlands

[21] Appl. No.: 605,219

[22] PCT Filed: Sep. 23, 1994

[86] PCT No.: PCT/EP94/03171

§ 371 Date: Mar. 11, 1996

§ 102(e) Date: Mar. 11, 1996

[87] PCT Pub. No.: WO95/09513

PCT Pub. Date: Apr. 6, 1995

[30] Foreign Application Priority Data

Sep. 30, 1993 [NL] Netherlands ............... 9301684

[51] Int. Cl.⁶ .......................................... H04Q 7/36
[52] U.S. Cl. ........................ 455/446; 455/67.1; 455/524
[58] Field of Search ........................ 455/33.1, 56.1, 455/33.4, 53.1, 226.4, 422, 423, 446, 447, 524, 507, 525, 67.1, 443; 379/59, 60

[56] References Cited

U.S. PATENT DOCUMENTS

| 5,179,722 | 1/1993 | Gunmar et al. | 455/33.1 |
| 5,307,510 | 4/1994 | Gunmar et al. | 455/67.1 |
| 5,465,390 | 11/1995 | Cohen | 455/33.4 |
| 5,561,841 | 10/1996 | Markus | 455/33.1 |

OTHER PUBLICATIONS

W. Schelvis et al., "Interactive planning tool for cellular land mobile radio networks", Proceedings Fourth Nordic Seminar on Digital Mobile Radio Communications, Oslo 1990, cover page and pp. 1–6.

H. Witberg, "Planning Pan European Networks with CAESAR", Proceedings of the 3rd FITCE Congress, Strasbourg, 2–7 Sep. 1991, pp. 1–4 and 91.

C. Scarati et al., "Radio Coverage For Cellular Networks Planning: a Methodological Approach", IEEE 1993, pp. 940–945.

Primary Examiner—Reinhard J. Eisenzopf
Assistant Examiner—Lee Nguyen
Attorney, Agent, or Firm—Michaelson & Wallace; Peter L. Michaelson

[57] ABSTRACT

Known methods for determining base station locations are based on human choice of that location which has the lowest degree of coverage (i.e. locally too little or no field strength present of neighboring base stations). The method according to the invention involves automated determination of base station locations by calculating, for each location, a number which is a function of a parameter associated with that location (telephone traffic, field strength, motor traffic) and of parameters belonging to adjoining locations, and by assigning a base station to the location having the most extreme number. Then the parameter associated with that location, and the parameters associated with adjoining locations are each adjusted on the basis of an adjustment function associated with the base station, and new numbers are calculated which are a function of the new, adjusted parameters, etc.

10 Claims, 3 Drawing Sheets

BASE STATION SITING PROCEDURE 20

| FIG. 1A | FIG. 1B |
|---|---|

BASE STATION SITING PROCEDURE 20

METHOD FOR DETERMINING BASE STATION LOCATIONS, AND DEVICE FOR APPLYING THE METHOD

A BACKGROUND OF THE INVENTION

The invention relates to a method for determining base station locations in an area which is subdivided into subareas, a subarea parameter being known per subarea.

Such a method is generally known and relates to human action. It involves so-called network planners determining base station locations by distributing base stations over the area intuitively or according to a fixed pattern. Then, with the aid of a so-called evaluation tool, for each subarea a (new) degree of coverage (a possible subarea parameter) is predicted, the effect of, inter alia, an aerial height to be used, an aerial type to be used and an amount of power to be emitted by a base station being checked at the same time. On the basis of the new predicted degree of coverage, the network planners then determine subsequent base station locations. The traffic capacity of each base station is set on the basis of so-called default values and/or on the basis of the insight of the network planners and may later be adjusted on the basis of practical experience and/or on the basis of predictions.

This has the drawback, inter alia, that such a known method is very labor-intensive and therefore expensive and time-consuming.

B SUMMARY OF THE INVENTION

An object of the invention is to provide a method of the type mentioned in the preamble which is less labor-intensive.

To this end, the method according to the invention is characterized in that, successively,

- subarea values are calculated which are each a function of a subarea parameter associated with a subarea and of a subarea parameter associated with at least one other subarea adjoining the subarea,
- an extreme subarea value is determined of all the subarea values,
- a subarea associated with the extreme subarea value is assigned a base station having an adjustment function,
- a subarea parameter associated with the subarea associated with the extreme subarea value is adjusted on the basis of the adjustment function, and a subarea parameter associated with at least one other subarea adjoining said subarea is adjusted on the basis of the adjustment function,
- subsequent subarea values are calculated which are each a function of a subarea parameter associated with a subarea and of a subarea parameter associated with at least one other subarea adjoining said subarea,
- a subsequent extreme subarea value is determined of all the subarea values,
- a subarea associated with the subsequent extreme subarea value is assigned a subsequent base station having a subsequent adjustment function,
- a subarea parameter associated with the subarea associated with the subsequent extreme subarea value is adjusted on the basis of the subsequent adjustment function, and a subarea parameter associated with at least one other subarea adjoining said subarea is adjusted on the basis of the subsequent adjustment function.

By, for example, storing, for each subarea, the subarea parameter (such as, for example, a coverage) in a data base and, for example, by means of a processor calculating the subarea value for each subarea, that subarea is found, in a manner which is readily automated, where the subarea value has an extreme value (minimum coverage). Because the subarea value is a function of both the subarea parameter associated with the subarea and of the parameters associated with adjoining subareas, the subarea associated with the extreme subarea value is very suitable as a base station location. Then the subarea associated with the extreme subarea value is assigned the base station having a corresponding adjustment function, which adjustment function results in adjustment of the subarea parameter associated with the subarea and of the subarea parameters associated with adjoining subareas, in a manner which is readily automated (raise in the value of the subarea parameter "coverage"). As a result of this adjustment, some subsequent subarea values should then be calculated, after which, again in a manner which is readily automated, the extreme subarea value is determined, etc. Thus the method according to the invention provides the option of virtually completely automated determination of base station locations, which method as a result is much less labour-intensive and thus less time-consuming and considerably cheaper in the long term.

The invention is based, inter alia, on the insight that it is possible, on the basis of subarea values which are each a function of a subarea parameter associated with the subarea and of subarea parameters associated with adjoining subareas, to find that subarea whose associated subarea value has an extreme value, and that this subarea in particular therefore should be assigned, a base station, after which subarea parameters associated with the subarea and with adjoining subareas should be adjusted on the basis of an adjustment function associated with the base station. This is because assignment of the base station to a subarea implies that the values of subarea parameters associated with the subarea and with adjoining subareas will change (thus the coverage will increase by placing a base station in the vicinity thereof). Furthermore, calculations of subarea values as a function of subarea parameters, of extreme subarea values and of adjustments to subarea parameters obviously preferably take place in an automated manner.

A first embodiment of the method according to the invention is characterized in that a subarea parameter is a traffic volume to be handled, and an extreme subarea value is a maximum subarea value, an adjustment function deducting at least a portion of a traffic handling capacity from a traffic volume to be handled.

This method provides the option of determining, in a manner which is readily automated, locations for base stations on the basis of the (telephone) traffic volume to be handled, as estimated for each subarea, and in practice leads to more efficient base station locations.

A second embodiment of the method according to the invention is characterized in that for each subarea a further subarea parameter is known, in which method, as soon as a first stop criterion is satisfied, successively

- further subarea values are calculated which are each a function of a further subarea parameter associated with a subarea and of a further subarea parameter associated with at least one other subarea adjoining the subarea,
- an extreme further subarea value is determined of all the further subarea values,
- a subarea associated with the extreme further subarea value is assigned a further base station having a further adjustment function, a further subarea parameter associated with the subarea associated with the extreme further subarea value is adjusted on the basis of the further adjustment function, and a further subarea parameter associated with at least one other subarea adjoining the subarea is adjusted on the basis of the further adjustment function, subsequent further subarea values are calculated which are each a function of a further subarea parameter associated with a subarea and of a further subarea parameter associated with at least one other subarea adjoining said subarea, a subsequent extreme further subarea value is determined of all the further subarea values, a subarea associated with the subsequent extreme further subarea value is assigned a subsequent further base station having a subsequent further adjustment function, a further subarea parameter associated with the subarea associated with the subsequent extreme further subarea value is adjusted on the basis of the subsequent further adjustment function, and a further subarea parameter associated with at least one other subarea adjoining said subarea is adjusted on the basis of the subsequent further adjustment function, until a second stop criterion is satisfied.

By determining, on the basis of the subarea parameters, in a manner which is readily automated, locations for base stations (the first phase) and, as soon as the first stop criterion is satisfied, stopping the determination in this manner of locations, and by subsequently determining, on the basis of the other (further) subarea parameters, in a manner which is readily automated, locations for base stations (the second phase), until the second stop criterion is satisfied, locations are established in different ways for each phase, which is more advantageous than establishing all the locations in one and the same way.

A third embodiment of the method according to the invention is characterized in that a further subarea parameter is a field strength already present, and an extreme further subarea value is a minimum further subarea value, a further adjustment function determining the maximum of a location-dependent field strength to be generated by the base station and a field strength already present.

This method provides the option of determining, during the first phase, in a manner which is readily automated, on the basis of the (telephone) traffic volume to be handled, as estimated for each subarea, locations for base stations and subsequently determining, during the second phase, in a manner which is readily automated, on the basis of the field strength predicted or measured for each subarea, supplementary locations for base stations, and in practice leads to base station locations which are again more efficient.

A fourth embodiment of the method according to the invention is characterized in that the first stop criterion comprises comparing all subarea values with a first threshold value, no more base stations being assigned as soon as a first percentage of a total number of subarea values is smaller than the first threshold value, and the second stop criterion comprising comparing all the further subarea values with a second threshold value, no further base stations being assigned as soon as a second percentage of a total number of further subarea values is greater than the second threshold value.

This involves the first phase being terminated as soon as it is the case that, for a first percentage (for example 95%, although a percentage of 100% is also one of the options) of the subareas, the associated subarea values (which are a function of estimated traffic volumes to be handled) are smaller than the first threshold value. The second phase is terminated as soon as it is the case that, for a second percentage (for example 95%, although a percentage of 100% is also one of the options) of the subareas, the associated subarea values (which are a function of predicted or measured field strengths) are greater than the second threshold value.

The invention further relates to a device for applying a method for determining base station locations in an area which is subdivided into subareas, a subarea parameter being known per subarea.

The device according to the invention is characterized in that the device is provided with first computing means for calculating subarea values which are each a function of a subarea parameter associated with a subarea and of a subarea parameter associated with at least one other subarea adjoining the subarea, comparison means for mutually comparing subarea values for determining an extreme subarea value, assignment means for assigning, to a subarea associated with the extreme subarea value, a base station having an adjustment function, second computing means for adjusting, on the basis of the adjustment function, a subarea parameter associated with the subarea associated with the extreme subarea value, and for adjusting, on the basis of the adjustment function, a subarea parameter associated with at least one other subarea adjoining the subarea.

In this context, the first computing means, the comparison means, the assignment means and the second computing means may be implemented by using processor means, the subarea parameters being stored in a memory linked to the processor means. Using the processor means is advantageous, given the iterative character of the method according to the invention.

A first embodiment of the device according to the invention is characterized in that a subarea parameter is a traffic volume to be handled, and an extreme subarea value is a maximum subarea value, an adjustment function to be performed by the second computing means deducting at least a portion of a traffic handling capacity from a traffic volume to be handled.

This device provides the option of determining, on the basis of the (telephone) traffic volume to be handled, as estimated for each subarea, locations for base stations and in practice leads to more efficient base station locations.

A second embodiment of the device according to the invention is characterized in that for each subarea a further subarea parameter is known and the device is provided with first stop criterion means for deactivating the first computing means, the comparison means, the assignment means and the second computing means, third computing means for calculating further subarea values which are each a function of a further subarea parameter associated with a subarea and of a further subarea parameter associated with at least one other subarea adjoining said subarea, further comparison means for mutually comparing further subarea values for determining an extreme further subarea value, further assignment means for assigning, to a subarea associated with the extreme further subarea value, a further base station having a further adjustment function, fourth computing means for adjusting, on the basis of the further adjustment function, a further subarea parameter associated with the subarea associated with the extreme further subarea value, and for adjusting, on the basis of the further adjustment function, a further subarea parameter associated with at least one other subarea adjoining the subarea, second stop criterion means for deactivating the third computing means, the further comparison means, the further assignment means and the fourth computing means.

In this context, the first stop criterion means, the third computing means, the further comparison means, the further assignment means, the fourth computing means and the second stop criterion means can be implemented by using the processor means already mentioned previously, the subarea parameters being stored in the memory linked to the processor means.

A third embodiment of the device according to the invention is characterized in that a further subarea parameter is a field strength already present, and an extreme further subarea value is a minimum further subarea value, a further adjustment function, which is to be performed by the fourth computing means, determining the maximum of a location-dependent field strength to be genepresent.the base station and a field strength already present.

This device provides the option of determining, during a first phase, on the basis of the (telephone) traffic volume to be handled, as estimated for each subarea, locations for base stations and subsequently determining, during a second phase, on the basis of the field strength predicted or measured for each subarea, supplementary locations for base stations, and in practice leads to base station locations which are again more efficient.

A fourth embodiment of the device according to the invention is characterized in that the first stop criterion means comprise a first comparison unit for comparing all subarea values with a first threshold value and, in the case of them falling below it, for generating a first counting signal, which first stop criterion means comprise a first counting unit for counting first counting signals and, in the case of a first count state being exceeded, generating a first deactivating signal, the second stop criterion means comprising a second comparison unit for comparing all subarea values with a second threshold value and, in the case of them exceeding it, for generating a second counting signal, which second stop criterion means comprise a second counting unit for counting second counting signals and, in the case of a second count state being exceeded, generating a second deactivating signal.

In this case, the first phase is terminated by deactivating, in response to the first deactivating signal, the first computing means, the comparison means, the assignment means and the second computing means, as soon as it is the case that, for a first percentage (for example 95%, although a percentage of 100% is also one of the options) of the subareas, the associated subarea values (which are a function of estimated traffic volumes to be handled) are smaller than the first threshold value, by causing the first comparison unit to drive the first counting unit whose first count state corresponds to the first percentage. The second phase is terminated by deactivating, in response to the second deactivating signal, the third computing means, the further comparison means, the further assignment means and the fourth computing means, as soon as it is the case that, for a second percentage (for example 95%, although a percentage of 100% is also one of the options) of the subareas, the associated subarea values (which are a function of predicted or measured field strengths) are greater than the second threshold value, by causing the second comparison unit to drive the second counting unit whose second count state corresponds to the second percentage. The first comparison unit, the first counting unit, the second comparison unit and the second counting unit can again be implemented by using the processor means already mentioned previously.

It should be noted that the term "adjoining" ought to be understood in a broad sense. Thus it is conceivable for there to be located, between a first subarea and a second subarea, an intermediate area which is of minor importance for calculating certain subarea values. In this case, the first and the second subarea will nevertheless be regarded as adjoining.

C REFERENCES

Planning Pan European Networks with CAESAR, Proceedings of the 3rd FITCE congress, Strassbourg [sic], 1991, by H. Witberg Interactive planning tool for cellular mobile radio networks, Proceedings Fourth Nordic Seminar on Digital Mobile Radio Communications, Oslo 1990, by W. Schelvis and B. Stortelder Dutch patent application 9301684 (priority document)

All references are regarded as being incorporated in the present application.

D BRIEF DESCRIPTION OF THE DRAWINGS

Figure 1B:
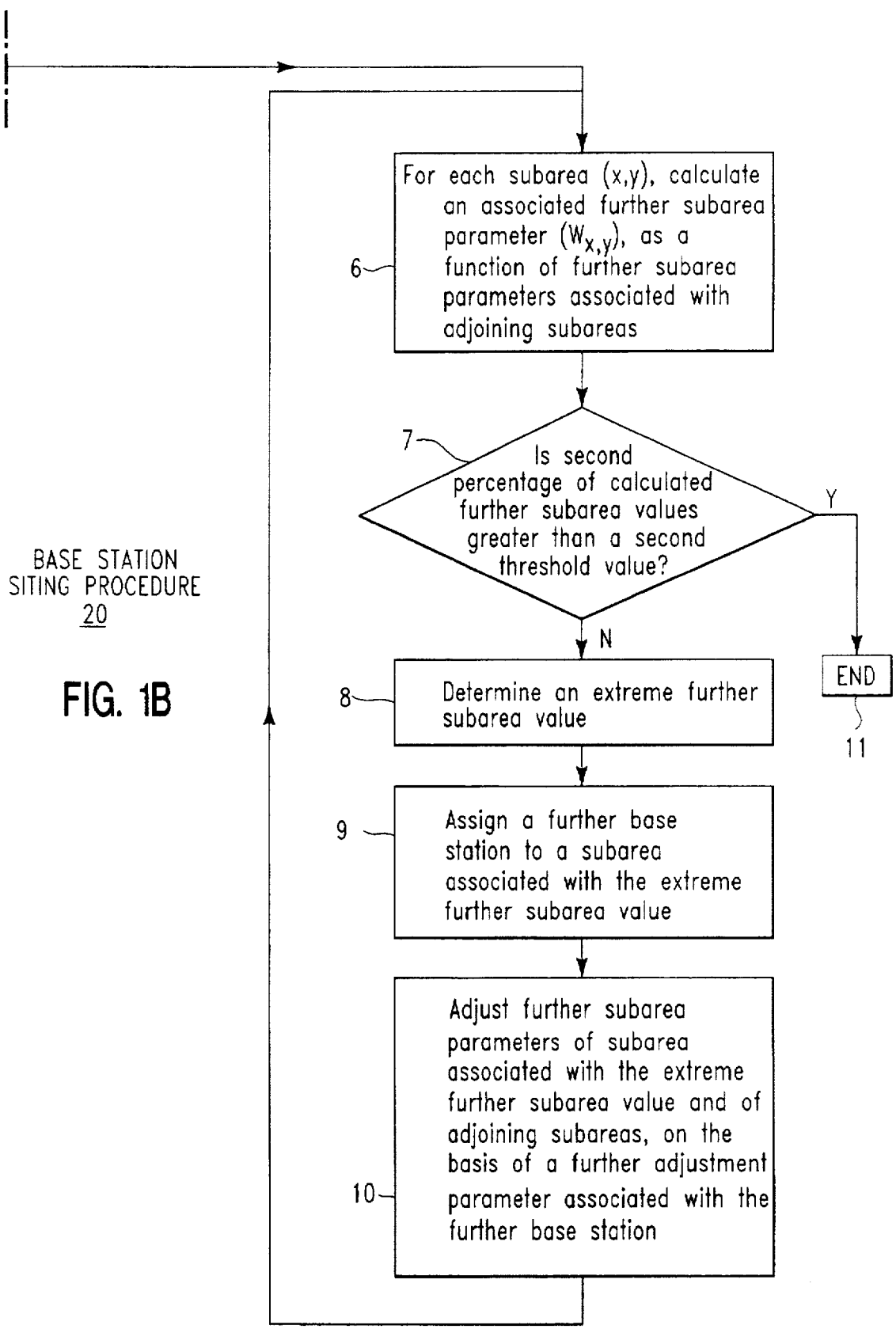
Figure 2:
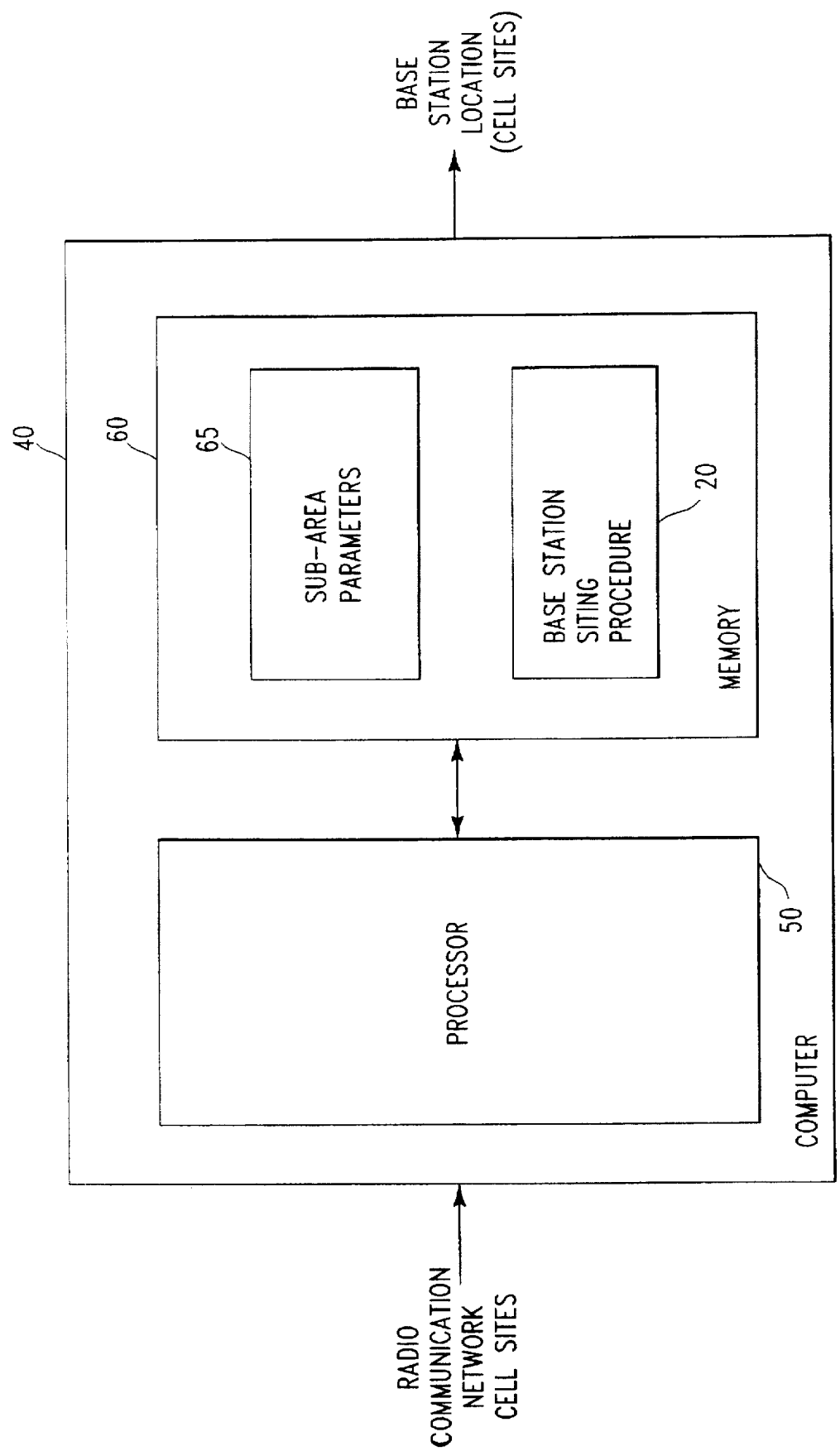

The invention will be explained in more detail with reference to an illustrative embodiment depicted in the accompanying figures, in which FIG. 1A, 1B show a flow diagram, of a method according to the invention; and FIG. 2 shows apparatus for implementing the inventive method. The invention will further be explained in more detail with reference to a computational example illustrated means of tables.

E DETAILED DESCRIPTION

Boxes of the flow diagram depicted in FIG. 1 specifically for inventive base station sitting procedure 20 shown therein, have the following meaning:

| box | meaning |
|---|---|
| 1 | for each subarea (x,y) calculate an associated subarea value $V_{x,y}$ as a function of an associated subarea parameter and as a function of subarea parameters associated with adjoining subareas |
| 2 | is a first percentage of all the calculated subarea values smaller than a first threshold value? if yes : go to box 6 if no : go to box 3 |
| 3 | determine an extreme subarea value |
| 4 | assign a base station to a subarea associated with the extreme subarea value |
| 5 | adjust subarea parameters of the subarea associated with the extreme subarea value and of adjoining subareas, on the basis of an adjustment function associated with the base station, go to box 1 |
| 6 | for each subarea (x,y) calculate an associated further subarea value $W_{x,y}$ as a function of an associated further subarea parameter and as a function of further subarea parameters associated with adjoining subareas |
| 7 | is a second percentage of all the calculated further subarea values greater than a second threshold value? if yes : go to box 11 if no : go to box 8 |
| 8 | determine an extreme further subarea value |

-continued

| box | meaning |
|---|---|
| 9 | assign a further base station to a subarea associated with the extreme further subarea value |
| 10 | adjust further subarea parameters of the subarea associated with the extreme further subarea value and of adjoining subareas, on the basis of a further adjustment parameter associated with the further base station, go to box 6 |
| 11 | end |

The mode of operation of the method according to the invention as described by means of the flow diagram for procedure 20 depicted in FIG. 1 is as follows. For each subarea (x,y) an associated subarea value $V_{x,y}$ is calculated as a function of a subarea parameter associated with that subarea and as a function of subarea parameters associated with adjoining subareas (box 1). Such a subarea parameter is, for example, a traffic volume to be handled, obtained by predictions and possible measurements, in erlang, as indicated further on in Table 1. Until a first percentage of, for example, 95% although a percentage of 100% is also one of the options, of all the calculated subarea values is smaller than a first threshold value (box 2), this section of the method is repeated, successively an extreme subarea value being determined (box 3), a base station being assigned to a subarea associated with the extreme subarea value (box 4), and subarea parameters of the subarea associated with the extreme subarea value, and of adjoining subareas, being adjusted on the basis of an adjustment function associated with the base station (box 5), whereafter subsequent subarea values are calculated (box 1), etc. In the case of the traffic volume to be handled being chosen as the subarea parameter, the adjustment function will deduct at least a portion of a traffic handling capacity from a traffic volume to be handled. As soon as the first percentage of, for example, 95% of all the calculated subarea values is smaller than the first threshold value (box 2), a jump is made to a further section of the method, in which, via a box (not shown in FIG. 1) situated between box 2 and box 6, first of all further subarea parameters are calculated on the basis of predictions and possible measurements. This takes place on the basis of evaluation tools known to those skilled in the art, a further subarea parameter being, for example, a field strength already present in a subarea, which field strength results from one (for example the closes base station. Thereafter, for each subarea (x,y) an associated further subarea value $W_{x,y}$ is calculated as a function of a further subarea parameter associated with said subarea and as a function of further subarea parameters associated with adjoining subareas (box 6). Until a second percentage of, for example, 95% although a percentage of 100% is also one of the options, of all the calculated further subarea values is greater than a second threshold value (box 7), this further section of the method is repeated, successively an extreme further subarea value being determined (box 8), a further base station being assigned to a subarea associated with the extreme further subarea value (box 9), and further subarea parameters of the subarea associated with the extreme further subarea value, and of adjoining subareas, being adjusted on the basis of a further adjustment function associated with the further base station (box 10), whereafter subsequent further subarea values are calculated (box 6), etc. In the case of the field strength already present being chosen as the further subarea parameter, the further adjustment function will determine the maximum of at least a portion of a location-dependent field strength to be generated by the base station and a field strength already present. As soon as the second percentage of, for example, 95% of all the calculated further subarea values is greater than the second threshold value (box 7), this further section of the method is terminated (box 11).

Assigning a (further) base station to a subarea whose associated (further) subarea value is a maximum (minimum), as specified by means of box 4 (box 9), could be taken further by specifying several preferred locations (such as high buildings for which a local authority has already given permission for aerials to be placed thereon, hill tops, watch-towers in heavily wooded areas, exchanges belonging to the fixed telephone network, etc.) in a subarea, for each preferred location various parameters being defined (such as the height of the preferred location, distance from the centre of the subarea, terrain built up or not built up, high buildings situated in the vicinity, which could cause reflections, etc.). By then calculating, for each preferred location, a number as a function of the associated parameters it is possible to determine the most favourable preferred location on the basis of the most extreme number. In the process it is even conceivable for the assignment of a base station to a subarea A to correspond to this base station being placed in an adjoining subarea B, because subarea A does not contain preferred locations whereas subarea B does. Thus a method, strongly linked to everyday practice, according to the invention is obtained.

Table 1 shows traffic volumes to be handled, $T_{x,y}$, in ten of erlang of an area which is subdivided into 25 subareas which are each specified by a (x,y) coordinate ($1 \leq x \leq 5$, $1 \leq y \leq 5$).

TABLE 1

| $T_{x,y}$ | x = 1 | x = 2 | x = 3 | x = 4 | x = 5 |
|---|---|---|---|---|---|
| y = 5 | 00 | 04 | 06 | 05 | 07 |
| y = 4 | 00 | 12 | 06 | 06 | 04 |
| y = 3 | 00 | 08 | 06 | 09 | 00 |
| y = 2 | 04 | 07 | 05 | 11 | 00 |
| y = 1 | 00 | 08 | 04 | 14 | 04 |

A formula for calculating subarea values (box 1) could, for example, be as follows:

$$V_{x,y}=4\times[T_{x,y}]+2\times[T_{x-1,y}+T_{x+1,y}+T_{x,y-1}+T_{x,y+1}]+[T_{x-1,y-1}+T_{x-1,y+1}+T_{x+1,y-1}+T_{x+1,y+1}]$$

Thus, for each subarea, the associated subarea value is calculated, the subarea parameter associated with said subarea counting 4 times more heavily than the subarea parameters associated with the subareas which adjoin to the North East, North West, South East and South West, and 2 times more heavily than the subarea parameters associated with the subareas adjoining to the North, the South, the East and the West. Table 2 shows an overview of the subarea values calculated according to this formula.

TABLE 2

| $V_{x,y}$ | x = 1 | x = 2 | x = 3 | x = 4 | x = 5 |
|---|---|---|---|---|---|
| y = 5 | 20 | 58 | 72 | 68 | 52 |
| y = 4 | 36 | 96 | 110 | 91 | 56 |
| y = 3 | 43 | 97 | 116 | 97 | 43 |
| y = 2 | 46 | 88 | 115 | 114 | 53 |
| y = 1 | 31 | 63 | 88 | 99 | 55 |

If the first threshold value is set to the value 10, not a single calculated subarea value is smaller than this first threshold value, and therefore it is certainly not the case that a first percentage of, for example, 95% is smaller than this first threshold value (box 2), by means of which subsequently the extreme subarea value is determined (box 3) and the base station is assigned to the subarea associated with this extreme subarea value (box 4). It will be evident that the extreme subarea value $V_{3,3}=116$ is associated with the subarea specified by coordinate (3.3). Thereafter, the subarea parameters of the subarea associated with the extreme subarea value and of adjoining subareas are adjusted (box 5), for example by deducting the handling capacity of the assigned base station from the subarea parameter associated with the subarea having the extreme subarea value, and deducting the remaining portion of the handling capacity from the subarea parameters of all the adjoining subareas (there are at most eight adjoining subareas), the remaining portion for example being distributed proportionally over the adjoining subareas (rounding downwards to obtain integers). Table 3 shows the traffic volumes $T_{x,y}$ to be handled, adjusted from Table 1, in erlang, if the handling capacity of the assigned base station is 40 erlang. Negative results are set to the value zero in this context.

TABLE 3

| $T_{x,y}$ | x = 1 | x = 2 | x = 3 | x = 4 | x = 5 |
|---|---|---|---|---|---|
| y = 5 | 00 | 04 | 06 | 05 | 07 |
| y = 4 | 00 | 08 | 02 | 02 | 04 |
| y = 3 | 00 | 04 | 00* | 05 | 00 |
| y = 2 | 04 | 03 | 01 | 07 | 00 |
| y = 1 | 00 | 08 | 04 | 14 | 04 |

Table 4 then shows an overview of the subsequent subarea values calculated according to the formula mentioned previously.

TABLE 4

| $V_{x,y}$ | x = 1 | x = 2 | x = 3 | x = 4 | x = 5 |
|---|---|---|---|---|---|
| y = 5 | 16 | 46 | 56 | 56 | 48 |
| y = 4 | 24 | 58 | 58 | 53 | 44 |
| y = 3 | 27 | 45 | 44 | 45 | 27 |
| y = 2 | 34 | 50 | 63 | 76 | 41 |
| y = 1 | 27 | 51 | 72 | 87 | 51 |

Because it is not the case that a percentage of 95% of the calculated subarea values is smaller than the threshold value 10, the subsequent extreme subarea value is then determined (87) and the subsequent base station is assigned to the subarea specified by coordinate (4.1). Thereafter, the subarea parameters of the subarea associated with the subsequent extreme subarea value and of adjoining subareas is again adjusted. Table 5 shows the traffic volumes $T_{x,y}$ to be handled, adjusted from Table 3, in erlang, if the handling capacity of the subsequent assigned base station is 30 erlang. Negative results are set to the value zero in this context.

TABLE 5

| $T_{x,y}$ | x = 1 | x = 2 | x = 3 | x = 4 | x = 5 |
|---|---|---|---|---|---|
| y = 5 | 00 | 04 | 06 | 05 | 07 |
| y = 4 | 00 | 08 | 02 | 02 | 04 |
| y = 3 | 00 | 04 | 00* | 05 | 00 |
| y = 2 | 04 | 03 | 00 | 04 | 00 |
| y = 1 | 00 | 08 | 01 | 00* | 01 |

Table 6 then shows an overview of the subsequent subarea values calculated according to the formula mentioned previously.

TABLE 6

| $V_{x,y}$ | x = 1 | x = 2 | x = 3 | x = 4 | x = 5 |
|---|---|---|---|---|---|
| y = 5 | 16 | 46 | 56 | 56 | 48 |
| y = 4 | 24 | 58 | 58 | 53 | 44 |
| y = 3 | 27 | 44 | 39 | 38 | 24 |
| y = 2 | 34 | 45 | 33 | 28 | 15 |
| y = 1 | 27 | 44 | 27 | 12 | 08 |

Because it is not the case that a percentage of 95% is smaller than the threshold value 10, the subsequent extreme subarea value is then determined (58) and, because there are two subsequent extreme subarea values, the subsequent base station is assigned, for example, to the subarea specified by coordinate (2,4). Thereafter, the subarea parameters of the subarea associated with the subsequent extreme subarea value and of adjoining subareas is again adjusted. Table 7 shows the traffic volumes $T_{x,y}$ to be handled, adjusted from Table 5, in erlang, if the handling capacity of the subsequent assigned base station is 40 erlang. Negative results are set to the value zero in this context.

TABLE 7

| $T_{x,y}$ | x = 1 | x = 2 | x = 3 | x = 4 | x = 5 |
|---|---|---|---|---|---|
| y = 5 | 00 | 00 | 02 | 05 | 07 |
| y = 4 | 00 | 00* | 00 | 02 | 04 |
| y = 3 | 00 | 00 | 00* | 05 | 00 |
| y = 2 | 04 | 03 | 00 | 04 | 00 |
| y = 1 | 00 | 08 | 01 | 00* | 01 |

Table 8 then shows an overview of the subsequent subarea values calculated according to the formula mentioned previously.

TABLE 8

| $V_{x,y}$ | x = 1 | x = 2 | x = 3 | x = 4 | x = 5 |
|---|---|---|---|---|---|
| y = 5 | 00 | 04 | 20 | 46 | 48 |
| y = 4 | 00 | 02 | 18 | 45 | 44 |
| y = 3 | 11 | 10 | 19 | 36 | 24 |
| y = 2 | 30 | 37 | 29 | 28 | 15 |
| y = 1 | 27 | 44 | 27 | 12 | 08 |

Because it is not the case that a percentage of 95% is smaller than the threshold value 10, the subsequent extreme subarea value is then determined (48) and the subsequent base station is assigned to the subarea specified by coordinate (5,5). Thereafter, the subarea parameters of the subarea associated with the subsequent extreme subarea value and of adjoining subareas is again adjusted. Table 9 shows the traffic volumes $T_{x,y}$ to be handled, adjusted from Table 7, in erlang, if the handling capacity of the subsequent assigned base station is 40 erlang. Negative results are set to the value zero in this context.

TABLE 9

| $T_{x,y}$ | x = 1 | x = 2 | x = 3 | x = 4 | x = 5 |
|---|---|---|---|---|---|
| y = 5 | 00 | 00 | 02 | 01 | 00* |
| y = 4 | 00 | 00* | 00 | 00 | 00 |
| y = 3 | 00 | 00 | 00* | 05 | 00 |

TABLE 9-continued

| $T_{x,y}$ | x = 1 | x = 2 | x = 3 | x = 4 | x = 5 |
|---|---|---|---|---|---|
| y = 2 | 04 | 03 | 00 | 04 | 00 |
| y = 1 | 00 | 08 | 01 | 00* | 01 |

Table 10 then shows an overview of the subsequent subarea values calculated according to the formula mentioned previously.

TABLE 10

| $V_{x,y}$ | x = 1 | x = 2 | x = 3 | x = 4 | x = 5 |
|---|---|---|---|---|---|
| y = 5 | 00 | 04 | 10 | 08 | 02 |
| y = 4 | 00 | 02 | 10 | 14 | 06 |
| y = 3 | 11 | 10 | 17 | 28 | 14 |
| y = 2 | 30 | 37 | 29 | 28 | 15 |
| y = 1 | 27 | 44 | 27 | 12 | 08 |

Because it is not the case that a percentage of 95% is smaller than the threshold value 10, the subsequent extreme subarea value is then determined (44) and the subsequent base station is assigned to the subarea specified by coordinate (2,1). Thereafter, the subarea parameters of the subarea associated with the subsequent extreme subarea value and of adjoining subareas is again adjusted. Table 11 shows the traffic volumes $T_{x,y}$ to be handled, adjusted from Table 9, in erlang, if the handling capacity of the subsequent assigned base station is 40 erlang. Negative results are set to the value zero in this context.

TABLE 11

| $T_{x,y}$ | x = 1 | x = 2 | x = 3 | x = 4 | x = 5 |
|---|---|---|---|---|---|
| y = 5 | 00 | 00 | 02 | 01 | 00* |
| y = 4 | 00 | 00* | 00 | 00 | 00 |
| y = 3 | 00 | 00 | 00* | 05 | 00 |
| y = 2 | 00 | 00 | 00 | 04 | 00 |
| y = 1 | 00 | 00* | 00 | 00* | 01 |

Table 12 then shows an overview of the subsequent subarea values calculated according to the formula mentioned previously.

TABLE 12

| $V_{x,y}$ | x = 1 | x = 2 | x = 3 | x = 4 | x = 5 |
|---|---|---|---|---|---|
| y = 5 | 00 | 04 | 10 | 08 | 02 |
| y = 4 | 00 | 02 | 10 | 14 | 06 |
| y = 3 | 00 | 00 | 14 | 28 | 14 |
| y = 2 | 00 | 00 | 13 | 27 | 15 |
| y = 1 | 00 | 00 | 04 | 10 | 08 |

Because it is not the case that a percentage of 95% is smaller than the threshold value 10, the subsequent extreme subarea value is then determined (28) and the subsequent base station is assigned to the subarea specified by coordinate (4,3). Thereafter, the subarea parameters of the subarea associated with the subsequent extreme subarea value and of adjoining subareas is again adjusted. Table 13 shows the traffic volumes $T_{x,y}$ to be handled, adjusted from Table 11, in erlang, if the handling capacity of the subsequent assigned base station is 40 erlang. Negative results are set to the value zero in this context.

TABLE 13

| $T_{x,y}$ | x = 1 | x = 2 | x = 3 | x = 4 | x = 5 |
|---|---|---|---|---|---|
| y = 5 | 00 | 00 | 02 | 01 | 00* |
| y = 4 | 00 | 00* | 00 | 00 | 00 |
| y = 3 | 00 | 00 | 00* | 00* | 00 |
| y = 2 | 00 | 00 | 00 | 00 | 00 |
| y = 1 | 00 | 00* | 00 | 00* | 01 |

Table 14 then shows an overview of the subsequent subarea values calculated according to the formula mentioned previously.

TABLE 14

| $V_{x,y}$ | x = 1 | x = 2 | x = 3 | x = 4 | x = 5 |
|---|---|---|---|---|---|
| y = 5 | 00 | 04 | 10 | 08 | 02 |
| y = 4 | 00 | 02 | 05 | 04 | 01 |
| y = 3 | 00 | 00 | 00 | 00 | 00 |
| y = 2 | 00 | 00 | 00 | 01 | 02 |
| y = 1 | 00 | 00 | 00 | 02 | 04 |

Since now 96% of the calculated subarea values are smaller than the first threshold value having the value 10, this section of the method according to the invention stops, base stations therefore having been assigned to the subareas having the coordinates (3,3), (4,1), (2,4), (5,5), (2,1) and (4,3). The process then continues correspondingly with the further section of the method according to the invention (box 6,7,8,9 and 10 from FIG. 1), after the further subarea parameters have been calculated, in a manner known to those skilled in the art, by means of an evaluation tool, on the basis of the base station locations determined. Preferably this involves making use of the evaluation tool called "CAESAR", which has been designed by the Royal PTT of the Netherlands and functions very well, which tool, on the basis of the given base station locations, calculates and displays for each subarea the degree of coverage as a further subarea parameter.

The computational example illustrated by means of the tables is obviously a heavily simplified version. In reality, a relatively small area such as the Netherlands would already be subdivided into, for example, 100.000 or even 1.000.000 subareas. The computational example could further be extended by

- calculations concerning the previously mentioned preferred locations, for example by supplementing the previously mentioned formula with additional parameters,
- calculations concerning different types of base stations which, for example, have different handling capacities,
- calculations concerning different possible distributions of the handling capacity over the subarea associated with the extreme subarea value and the adjoining or even non-adjoining subareas, and
- calculations concerning different possible distributions of the remaining portion of the handling capacity over the adjoining or even non-adjoining subareas, for example depending on the demand for handling capacity for each subarea.

The formula mentioned previously is therefore arbitrary and can be modified in many ways (for example by traffic volumes to be handled, of additional non-adjoining subareas, being involved in the calculation of a subarea value), as long as a subarea value associated with a subarea C is at least a function of a subarea parameter associated with the subarea C and of another subarea parameter associated with a subarea D, which very often (but not necessarily always) will adjoin the subarea C. Furthermore, the threshold values and the percentages are arbitrary. As mentioned earlier, even percentages of 100% are possible, as long as the percent-ages are greater than 0% and the threshold values are situated between the minimum and maximum subarea values calculated in the first instance, the method will function properly and assign base stations.

A device according to the invention for applying a method according to the invention, comprising first computing means for calculating subarea values, comparison means for mutually comparing subarea values for determining an extreme subarea value, assignment means for assigning, to a subarea associated with the extreme subarea value, a base station having an adjustment function, second computing means for adjusting subarea parameters, and preferably comprising first stop criterion means comprising a first comparison unit for comparing all subarea values with a first threshold value and, in the case of the subarea values falling below the first threshold value, for generating a first counting signal, and comprising a first counting unit for counting first counting signals and, in the case of a first count state being exceeded, for generating a first deactivating signal for deactivating the first computing means, the comparison means, the assignment means and the second computing means, third computing means for calculating further subarea values, further comparison means for mutually comparing further subarea values for determining an extreme further subarea value, further assignment means for assigning, to a subarea associated with the extreme further subarea value, a further base station having a further adjustment function, fourth computing means for adjusting further subarea parameters, second stop criterion means comprising a second comparison unit for comparing all subarea values with a second threshold value and, in the case of the subarea values exceeding the second threshold value, for generating a second counting signal, and comprising a second counting unit for counting second counting signals and, in case of a second count state being exceeded, generating a second deactivating signal for deactivating the third computing means, the further comparison means, the further assignment means and the fourth computing means, as a consequence of the iterative character of the method according to the invention is preferably implemented by means of processor means, a possible implementation of the previously mentioned computing means, comparison means, assignment means and stop criterion means on the basis of pieces of software in the processor means being as follows, for example. This implementation, as illustratively shown in FIG. 2, utilizes computer 40, itself having processor 50 linked to memory 60, wherein the memory stores appropriate program code for inventive base station siting procedure 20 and values for subarea parameters 65.

The first computing means calculate subarea values $V_{x,y}$ which are each a function of a subarea parameter $T_{x,y}$ associated with a subarea, and of a subarea parameter associated with at least one other subarea adjoining said subarea, for example according to the previously mentioned formula:

```
10   for x = 1 step 1 to 5 do
11      for y = 1 step 1 to 5 do
12         V(x,y): = 4T(x,y) + 2{T(x − 1, y) + T(x + 1, y) + T(x,y − 1) + T(x,y + 1)} ++
           {T(x − 1, y − 1) + T(x − 1, y + 1) + T(x + 1, y − 1) + T(x + 1, y + 1)}
13      next y
14   next x
```

Here it is being assumed that $T_{x,y}$ for the coordinates (x,y) with $1 \leq x \leq 5$, $1 \leq y \leq 5$ has already been predicted and/or calculated, and that $T_{x,y}$ for the coordinates (x,y) with x=0 ($0 \leq y \leq 6$) and x=6 ($0 \leq y \leq 6$) and y=0 ($0 \leq x \leq 6$) and y=6 ($0 \leq x \leq 6$) has been given the value zero.

The third computing means calculate further subarea values $W_{x,y}$ which are each a function of a further subarea parameter $F_{x,y}$ associated with a subarea and of a further subarea parameter associated with at least one other subarea adjoining said subarea, in a manner corresponding to that described above, in which process it would even be possible to retain the ratios used in the formula.

The second computing means adjust a subarea parameter $T_{x,y}$ associated with the subarea associated with the extreme subarea value $V_{x,y}$ on the basis of the adjustment function, and a subarea parameter associated with at least one other subarea adjoining the subarea, on the basis of the adjustment function, for example by deducting the handling capacity (e.g., 40 erlang) of the assigned base station from the subarea parameter $T_{x,y}$ associated with the subarea having the extreme subarea value, and deducting the remaining portion $R_{x,y}$ of the handling capacity from the subarea parameters of all the adjoining subareas (for the sake of simplicity it will be assumed that there are eight adjoining subareas), the remaining portion being distributed, for example, proportionately over the adjoining subareas. In the process, negative results are set to the value zero:

```
20   (Rx,y): = 40 − T(x,y)
21   if R(x,y) < 0 then R(x,y): = 0 else R(x,y): = R(x,y)
22   if T(x,y) < 40 then T(x,y): = 0 else T(x,y): = T(x,y) − 40
23   for i = −1 step 1 to 1 do
24      for j = −1, 1 do
```

-continued

```
25        if T(x + i, y + j) < (R(x,y)/8) then T(x + i, y + j): = 0
          else T(x + i, y + j): = T(x + i, y + j) – (R(x,y)/8)
26     next j
27   next i
28   for i = –1, 1 do
29        if T(x + i,y) < (R(x,y)/8) then T(x + i,y): = 0
          else T(x + i,y): = T(x + i,y) – (R(x,y)/8)
30   next i
```

The fourth computing means adjust a further subarea parameter $F_{x,y}$ associated with the subarea associated with the extreme further subarea value $W_{x,y}$, on the basis of the further adjustment function, and a further subarea parameter associated with at least one other subarea adjoining that subarea, on the basis of the further adjustment function, for example, as specified earlier, by determining the maximum of at least a portion of a location-dependent field strength to be generated by the base station (assigned to the subarea which is specified by coordinate (x,y)), and a field strength already present, it being assumed that the location-dependent field strength $E_{x+i,y+j}$ to be generated by the base station decreases exponentially each time i or j is incremented/ decremented

```
       (E(x + i, y + j): = E(X,y) * exp(–abs(i)–abs(j))):
40     for i = –5 step 1 to 5 do
41        for j = –5 step 1 to 5 do
42           E(x + i, y + j): = E(x,y) * exp(–abs(i)–abs(j))
43           if F(x + i, y + j) < E(x + i, y + i)then
                F(x + i, y + j): = E(x + i, y + j)
44        next j
45     next i
```

The comparison means mutually compare subarea values to determine an extreme subarea value. If a subarea parameter is, for example, a traffic volume to be handled, the extreme subarea value will be a maximum subarea value:

```
50   A: = 0; m: = 0; n: = 0
51   for x = 1 step 1 to 5 do
52      for y = 1 step 1 to 5 do
53         if V(x,y) > A then     A: = V(x,y)
                                   m: = x
                                   n: = y
54      next y
55   next x
```

The further comparison means mutually compare further subarea values to determine an extreme further subarea value. If a subarea parameter is, for example, a field strength already present, the extreme further subarea value will be a minimum subarea value:

```
60   B: = 1000; p: = 0; q: = 0
61   for X = 1 step 1 to 5 do
62      for y = 1 step 1 to 5 do
63         if W(x,y) < B then     B: = W(x,y)
                                   p: = x
                                   q: = y
64      next y
65   next x
```

The assignment means, for the purpose of assigning, to a subarea associated with the extreme subarea value, a base station having an adjustment function supply the latest calculated (in line 53) values of m and n, respectively, as x and y, respectively, to the lines 20 to 30 inclusive.

The further assignment means, for the purpose of assigning, to a subarea associated with the extreme further subarea value, a further base station having a further adjustment function supply the latest calculated (in line 63) values of p and q, respectively, as x and y, respectively, to the lines 40 to 45 inclusive.

The first stop criterion means comprise a first comparison unit for comparing all subarea values $V_{x,y}$ with a first threshold value (d1) and, in the case of them falling below it, for generating a first counting signal (t) and comprise a first counting unit for counting first counting signals and, in case of a first count state (for example the value 23, since in this example the value 24 corresponds to 96%) being exceeded, generating a first deactivating signal (deact1):

```
70   t: = 0, deact1: = 0
71   for x = 1 step 1 to 5 do
72      for y = 1 step 1 to 5 do
73         if V(x,y) < d1 then t: = t + 1
74      next y
75   next x
76   if t > 23 then deact1: = 1
```

The second stop criterion means comprise a second comparison unit for comparing all subarea values $W_{x,y}$ with a second threshold value (d2) and, in the case of them exceeding it, for generating a second counting signal (u) and comprise a second counting unit for counting second counting signals and, in case of a second count state (for example the value 23, since in this example the value 24 corresponds to 96%) being exceeded, generating a second deactivating signal (deact2):

```
80   u: = 0; deact2: = 0
81   for x = 1 step 1 to 5 do
82      for y = 1 step 1 to 5 do
83         if W(x,y) > d2 then u: = u + 1
84      next y
85   next x
86   if u > 23 then deact2: = 1
```

The first and second deactivating signals will, if the device according to the invention is implemented by means of processor means, lead to jumps in the software, for example in so-called "goto" statements being executed, and will then, therefore, literally switch off means not determined. Such "goto" statements will further be required more often in the abovementioned illustrative embodiment in order to link together different pieces of software and in order to enable iterations of a separate piece of software.

It should be noted that there is obviously no difference between, on the one hand, recording a certain percentage of values which satisfy a specific condition and, on the other hand, recording a certain number of values which satisfy the specific condition. Thus, 96% of the values will correspond to 24 of a total of 25 values, while a minimum percentage of 95% of the values will correspond to 24 or 25 of the total of 25 values, etc.

We claim:

1. For use with a communications network encompassing a geographic area divided into a plurality of geographically adjoining subareas, a computer implemented method for determining particular ones of the subareas at which communications base stations are to be located, the computer having a processor and a memory, wherein the method, implemented through executable program instructions stored in the memory, comprises the steps of:
   (a) calculating a plurality of subarea values, wherein for each different first one of the subareas a corresponding one of the subarea values is a function of first and second subarea parameters associated with the first one subarea and a second one of the subareas adjoining the first one subarea, respectively;
   (b) determining, from amongst the plurality of subarea values, an extreme subarea value;
   (c) assigning a communications base station to a third one of the subareas which has the extreme subarea value associated therewith, the base station having a predefined adjustment function associated therewith;
   (d) varying, through the adjustment function, corresponding ones of the subarea parameters associated with the third one subarea and a fourth one of the subareas which adjoins the specific third one subarea; and
   (e) repeating steps (a)–(d) above, to assign additional ones of the base stations to corresponding ones of the subareas, until a predefined first stop condition occurs.

2. The method of claim 1 wherein each of the first and second subarea parameters represents a value of traffic volume to be handled by the first and second one subareas, respectively; the extreme subarea value is a maximum value then existing amongst all of the plurality of subarea values; and the adjustment function reduces the value of traffic volume to be handled by each of the third and fourth ones of the subareas by a corresponding predefined amount.

3. The method of claim 1 wherein each one of the subareas has a further subarea parameter associated therewith so as to form a plurality of further subarea parameters and the method further comprises the steps, performed in response to an occurrence of the first stop condition, of:
   (a) calculating a plurality of further subarea values, wherein for each different first one of the subareas a corresponding one of the further subarea values is a function of first and second further subarea parameters associated with the first one subarea and a second one of the subareas adjoining the first one subarea, respectively;
   (b) determining, from amongst the plurality of further subarea values, an extreme further subarea value;
   (c) assigning a communications base station to a third one of the subareas which has the extreme further subarea value associated therewith, the base station having a predefined further adjustment function associated therewith;
   (d) varying, through the further adjustment function, corresponding ones of the further subarea parameters associated with the third one subarea and a fourth one of the subareas which adjoins the specific third one subarea; and
   (e) repeating steps (a)–(d) above, to assign additional ones of the base stations to corresponding ones of the subareas, until a predefined second stop condition occurs.

4. The method of claim 3 wherein each of the first and second further subarea parameters represents current field strength in the first and second one subareas, respectively; the extreme further subarea value is a minimum value then existing amongst all of the plurality of further subarea values; and the further adjustment function determines a maximum location-dependent field strength for each of the third and fourth further subareas in response to field strength to be generated by a base station assigned to the third one subarea and values of current field strength associated with the third and fourth ones of the subareas.

5. The method in claim 4 further comprising the steps of:
   comparing all of the subarea values against a first predefined threshold value; and terminating assignment of any said further base stations whenever a first percentage of a total number of subarea values is less than the first predefined threshold value so as to form the first stop condition; and
   comparing all of the further subarea values against a second predefined threshold value and terminating assignment of said additional base stations whenever a second percentage of a total number of subarea values is less than the second predefined threshold value so as to form the second stop condition.

6. Apparatus for determining particular ones of a plurality of different geographically adjoining subareas, which collectively form an area encompassed by a communications network, at which communications base stations are to be located, the apparatus comprising:
   a processor; and
   a memory having executable program instructions stored therein;
   wherein, in response to the instructions, the processor:
      (a) calculates a plurality of subarea values, wherein for each different first one of the subareas a corresponding one of the subarea values is a function of first and second subarea parameters associated with the first one subarea and a second one of the subareas adjoining the first one subarea, respectively;
      (b) determines, from amongst the plurality of subarea values, an extreme subarea value;
      (c) assigns a communications base station to a third one of the subareas which has the extreme subarea value associated therewith, the base station having a predefined adjustment function associated therewith;
      (d) varies, through the adjustment function, corresponding ones of the subarea parameters associated with the third one subarea and a fourth one of the subareas which adjoins the specific third one subarea; and
      (e) repeats operations (a)–(d) above, to assign additional ones of the base stations to corresponding ones of the subareas, until a predefined first stop condition occurs.

7. The apparatus of claim 6 wherein each of the first and second subarea parameters represents a value of traffic volume to be handled by the first and second one subareas, respectively; the extreme subarea value is a maximum value then existing amongst all of the plurality of subarea values; and the adjustment function reduces the value of traffic volume to be handled by each of the third and fourth ones of the subareas by a corresponding predefined amount.

8. The apparatus of claim 6 wherein each one of the subareas has a further subarea parameter associated therewith so as to form a plurality of further subarea parameters and the processor, in response to the stored instructions and an occurrence of the first stop condition:
   (a) calculates a plurality of further subarea values, wherein for each different first one of the subareas a corresponding one of the further subarea values is a function of first and second further subarea parameters associated with the first one subarea and a second one of the subareas adjoining the first one subarea, respectively;

(b) determines, from amongst the plurality of further subarea values, an extreme further subarea value;

(c) assigns a communications base station to a third one of the subareas which has the extreme further subarea value associated therewith, the base station having a predefined further adjustment function associated therewith;

(d) varies, through the further adjustment function, corresponding ones of the further subarea parameters associated with the third one subarea and a fourth one of the subareas which adjoins the specific third one subarea; and (e) repeats operations (a)–(d) above, to assign additional ones of the base stations to corresponding ones of the subareas, until a predefined second stop condition occurs.

9. The apparatus of claim 8 wherein each of the first and second further subarea parameters represents current field strength in the first and second one subareas, respectively; the extreme further subarea value is a minimum value then existing amongst all of the plurality of further subarea values; and the further adjustment function determines a maximum location-dependent field strength for each of the third and fourth further subareas in response to field strength to be generated by a base station assigned to the third one subarea and values of current field strength associated with the third and fourth ones of the subareas.

10. The apparatus in claim 9 wherein the processor, in response to the stored instructions:

compares all of the subarea values against a first predefined threshold value; and terminating assignment of any said further base stations whenever a first percentage of a total number of subarea values is less than the first predefined threshold value so as to form the first stop condition; and compares all of the further subarea values against a second predefined threshold value and terminating assignment of said additional base stations whenever a second percentage of a total number of subarea values is less than the second predefined threshold value so as to form the second stop condition.

* * * * *